United States Patent [19]
Demmin et al.

[11] Patent Number: 5,863,417
[45] Date of Patent: *Jan. 26, 1999

[54] METHOD FOR ANALYZING FOR STRIPPABLE HYDROCARBON ON FCC CATALYST

[75] Inventors: Richard A. Demmin; James P. Glass, Jr., both of Baton Rouge, La.

[73] Assignee: Exxon Research and Engineering Company, Florham Park, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 771,072

[22] Filed: Dec. 20, 1996

[51] Int. Cl.$^6$ .................................................. C10G 11/18
[52] U.S. Cl. ........................... 208/113; 208/120; 208/150; 208/DIG. 1; 585/905; 585/906; 502/55
[58] Field of Search ..................................... 208/113, 120, 208/150, DIG. 1; 585/905, 906; 502/55

[56] References Cited

U.S. PATENT DOCUMENTS 4,234,315  11/1980  Scott .......................................... 73/23.1
4,891,186   1/1990  Roberge et al. ............................ 422/83
5,284,575   2/1994  Owen ........................................ 208/113

OTHER PUBLICATIONS

Gary D. Christian, "Analytical Chemistry", pp. 362 and 369, 1986.

Primary Examiner—Walter D. Griffin
Assistant Examiner—Nadine Preisch
Attorney, Agent, or Firm—James H. Takemoto

[57] ABSTRACT

A FCC process in which spent catalyst is stripped of hydrocarbon in a stripping zone prior to entering the regenerator. In order to maximize the amount of strippable hydrocarbon removed in the stripping zone, a sample of spent catalyst is removed prior to entering the regenerator. The spent catalyst is analyzed for strippable hydrocarbon by conducting the sample to a heated catalyst collection vessel, stripping hydrocarbon from the catalyst using an inert stripping gas, oxidizing the gasses from the collection vessel to carbon dioxide and water, and measuring the amount of carbon dioxide and/or water which amount of carbon dioxide and/or water can be correlated to the amount of strippable hydrocarbon on the catalyst sample.

5 Claims, 2 Drawing Sheets

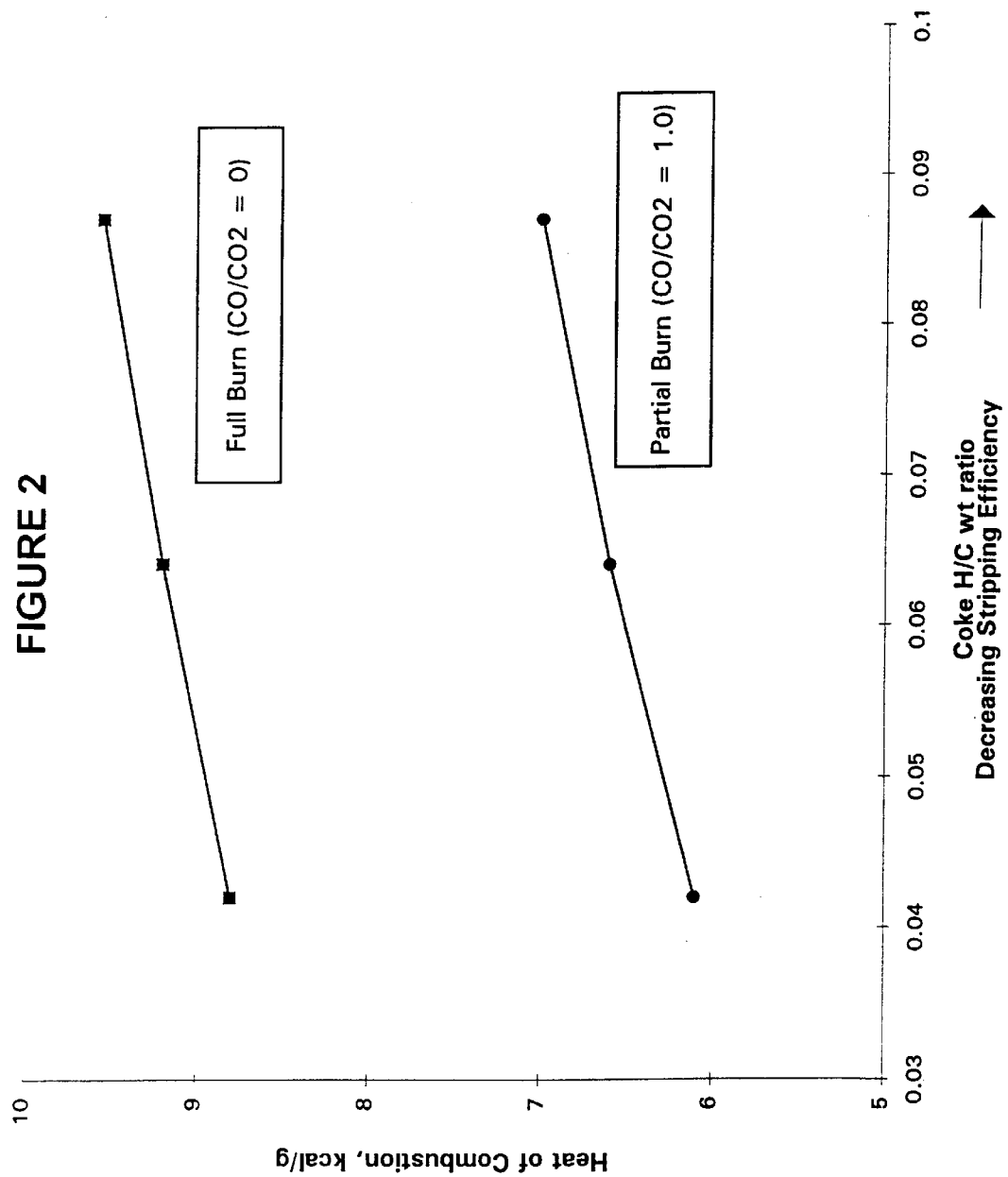

METHOD FOR ANALYZING FOR STRIPPABLE HYDROCARBON ON FCC CATALYST

FIELD OF THE INVENTION

This invention relates to the catalytic cracking of hydrocarbon feeds. More particularly, strippable hydrocarbons from catalyst exiting the stripper are analyzed to enable real time optimization of stripper performance.

BACKGROUND OF THE INVENTION

Fluidized Catalytic Cracking (FCC) is a well known process for converting heavy hydrocarbon feeds to lighter products. Most FCC units include a reactor and a regenerator in the fluid solids portion of the overall FCC process. The movement of catalyst between the reactor and regenerator represents a cyclical process. Heavy hydrocarbon feed is contacted with hot catalyst in the reactor to produce lighter products. During the cracking process, carbonaceous deposits or coke and other contaminants such as metals are deposited on the catalyst resulting in at least a partial deactivation of the catalyst. The deactivated catalyst is separated from the lighter products and sent to a regenerator. The coke deposits are removed from catalyst particles by burning and the regenerated catalyst recycled to the reactor. Heat from coke combustion is typically used to help maintain the desired temperature in the reactor where additional cracking of feed occurs.

Deactivated catalyst particles sent to the regenerator are first subjected to a stripping process to recover a substantial fraction of adsorbed hydrocarbon material. The recovered hydrocarbons from the stripping zone are typically added to the cracked hydrocarbons from the FCC reactor to enhance the yield of total hydrocarbon materials. These recovered hydrocarbonaceous materials are then sent for further processing to desired products. The stripped catalyst is sent to a regenerator.

In order to monitor performance of the stripping zone, it is typical to measure coke on catalyst. Current techniques for measuring coke on catalyst do not, however, differentiate between strippable hydrocarbons and non-volatile coke.

It would be desirable to maximize the yield of strippable hydrocarbon from spent FCC catalyst without using excessive stripping gas, typically steam. In order to achieve maximum yield with minimal stripping gas, it would be desirable to have a quick and reliable test for measuring strippable hydrocarbon. For example, setting the preferred stripping steam rate for a given feed composition and process conditions is typically a trial and error procedure relating regenerator conditions to steam rate changes.

SUMMARY OF THE INVENTION

The present invention provides a process for treating a hydrocarbon feed in a FCC unit containing a stripping zone whereby strippable hydrocarbon is separately analyzed from non-volatile coke on catalyst. Accordingly, there is provided a catalytic cracking process in which hydrocarbon feed is contacted with zeolite catalyst under catalytic cracking conditions in a reactor zone, catalyst which is at least partially deactivated and cracked hydrocarbon products are separated in at least one separation zone, separated catalyst is at least partially stripped of strippable hydrocarbon in a stripping zone under stripping conditions, stripped catalyst is contacted with oxidizing gas in a regenerator under regenerating conditions to remove carbonaceous deposits from the at least partially deactivated catalyst and regenerated catalyst is contacted with further hydrocarbon feed wherein the improvement comprises:

(a) removing a sample of at least partially deactivated catalyst prior to the regenerator, (b) conducting the deactivated catalyst sample to a heated catalyst collection vessel;

(c) adding a stripper gas to the collection vessel thereby removing strippable hydrocarbon from the deactivated catalyst, (d) conducting the stripped hydrocarbon to a gas collection vessel containing an oxidation catalyst, (e) oxidizing the stripped hydrocarbon to carbon dixoide and water, (f) measuring the amount of at least one of carbon dioxide and water, and (g) conducting the stripped deactivated catalyst sample back to the deactivated catalyst sent to the regenerator.

BRIEF DESCRIPTION OF THE DRAWINGS

FIG. 2 is a plot of heat of combustion of coke as a function of hydrogen to carbon ratio of coke burned in the regenerator.

DETAILED DESCRIPTION OF THE INVENTION

Figure 1:
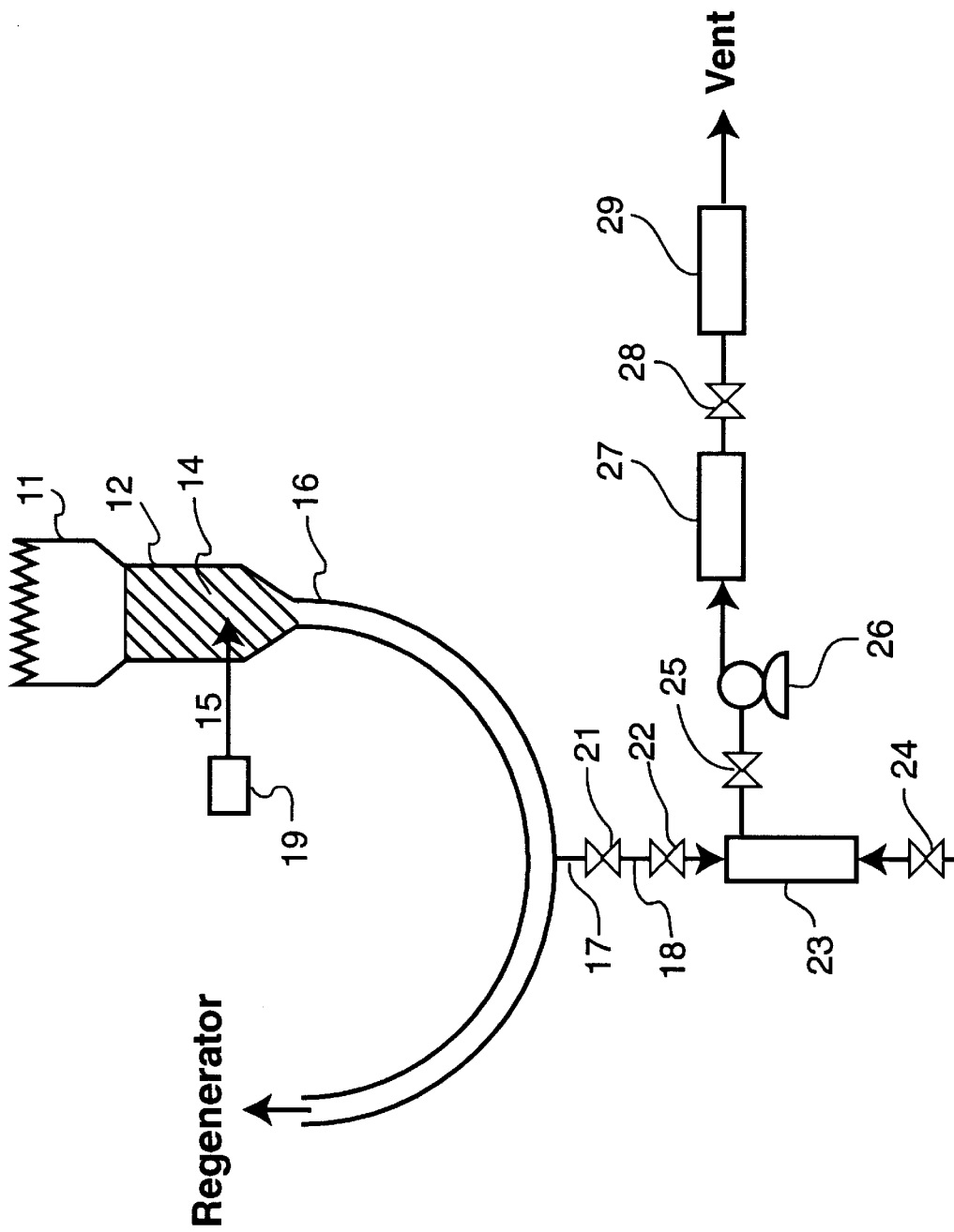
FIG. 1 is a flow diagram showing the process for measuring strippable hydrocarbon from deactivated FCC catalyst.

The FCC process of this invention provides a method for utilizing analytical information on the amount of strippable hydrocarbon on deactivated catalyst from the FCC reactor to maximize the recovery of such strippable hydrocarbon in the stripping zone with minimal use of stripping gas instead of burning non-recovered hydrocarbon in the regenerator along with coke on catalyst. The present method allows for increased yield of more valuable product streams as compared to using non-recovered strippable hydrocarbon for its fuel value in the regenerator.

A typical FCC reactor includes a reaction zone containing a riser reactor, a separation zone containing one or more cyclones and a stripping zone. In the reaction zone, hot catalyst particles are contacted with fresh feed to form cracked hydrocarbon products and at least partially deactivated (spent) catalyst, i.e., catalyst on which has been deposited coke and/or coke precursors. Separation of cracked hydrocarbon products from spent catalyst occurs in a separation zone containing cyclones. Spent catalyst then passes to a stripping zone. Conventional feedstocks to an FCC unit are gas oils and vacuum gas oils having initial and end boiling points in the range of 204° C. (400° F.) to 566° C. (1050° F.) and Conradson Carbon contents of about 0 to 2 wt. %. Small amounts (5–15%) of higher boiling fractions can be blended into the conventional feedstocks. However, larger amounts of such higher boiling feeds interfere with FCC operation by producing severe coking and even destruction of the catalytic cracking catalyst by the high levels of Conradson Carbon and metals present in the higher boiling feed.

The catalyst which is used in this invention can be any catalyst which is typically used to catalytically "crack" hydrocarbon feeds. It is preferred that the catalytic cracking catalyst comprise a crystalline tetrahedral framework oxide component. This component is used to catalyze the breakdown of primary products from the catalytic cracking reaction into clean products such as naphtha for fuels and olefins for chemical feedstocks. Preferably, the crystalline tetrahedral framework oxide component is selected from the group consisting of zeolites, tectosilicates, tetrahedral aluminophosphates (ALPOs) and tetrahedral silicoaluminophosphates (SAPOs). More preferably, the crystalline framework oxide component is a zeolite.

Zeolites which can be employed in accordance with this invention include both natural and synthetic zeolites. These zeolites include gmelinite, chabazite, dachiardite, clinoptilolite, faujasite, heulandite, analcite, levynite, erionite, sodalite, cancrinite, nepheline, lazurite, scolecite, natrolite, offretite, mesolite, mordenite, brewsterite, and ferrierite. Included among the synthetic zeolites are zeolites X, Y, A, L. ZK-4, ZK-5, B, E, F, H, J, M, Q, T, W, Z, alpha and beta, ZSM-types and omega.

In general, aluminosilicate zeolites are effectively used in this invention. However, the aluminum as well as the silicon component can be substituted for other framework components. For example, the aluminum portion can be replaced by boron, gallium, titanium or trivalent metal compositions which are heavier than aluminum. Germanium can be used to replace the silicon portion.

The catalytic cracking catalyst used in this invention can further comprise an active porous inorganic oxide catalyst framework component and an inert catalyst framework component. Preferably, each component of the catalyst is held together by attachment with an inorganic oxide matrix component.

The active porous inorganic oxide catalyst framework component catalyzes the formation of primary products by cracking hydrocarbon molecules that are too large to fit inside the tetrahedral oxide component. The active porous inorganic oxide catalyst framework component of this invention is preferably a porous inorganic oxide that cracks a relatively large amount of hydrocarbons into lower molecular weight hydrocarbons as compared to an acceptable thermal blank. A low surface area silica (e.g., quartz) is one type of acceptable thermal blank. The extent of cracking can be measured in any of various ASTM tests such as the MAT (microactivity test, ASTM #D3907-8). Compounds such as those disclosed in Greensfelder, B. S., et al., *Industrial and Engineering Chemistry*, pp. 2573–83, November 1949, are desirable. Alumina, silica-alumina and silica-alumina-zirconia compounds are preferred.

The inert catalyst framework component densifies, strengthens and acts as a protective thermal sink. The inert catalyst framework component used in this invention preferably has a cracking activity that is not significantly greater than the acceptable thermal blank. Kaolin and other clays as well as cc-alumina, titania, zirconia, quartz and silica are examples of preferred inert components.

The inorganic oxide matrix component binds the catalyst components together so that the catalyst product is hard enough to survive interparticle and reactor wall collisions. The inorganic oxide matrix can be made from an inorganic oxide sol or gel which is dried to "glue" the catalyst components together. Preferably, the inorganic oxide matrix will be comprised of oxides of silicon and aluminum. It is also preferred that separate alumina phases be incorporated into the inorganic oxide matrix. Species of aluminum oxyhydroxides γ-alumina, boehmite, diaspore, and transitional aluminas such as α-alumina, β-alumina, γ-alumina, δ-alumina, ε-alumina, κ-alumina, and ρ-alumina can be employed. Preferably, the alumina species is an aluminum trihydroxide such as gibbsite, bayerite, nordstrandite, or doyelite.

In conducting the catalytic cracking operation, fresh feed and heated catalyst are contacted in a riser. The temperature employed in the riser ranges from about 750° F. (399° C.) to about 1300° F. (1704° C.), preferably from about 900° F. (482° C.) to about 1050° F. (566° C.), and the pressure employed is one ranging from about 0 psig (101 kPa) to about 150 psig (1136 kPa, preferably from about 0 psig (101 kPa) to about 45 psig (411 kPa). Suitably, catalyst/feed ratios in the cracking zone used to convert the feed to lower boiling products are not more than about 30:1, and may range from about 20:1 to about 2:1, preferably from about 4:1 to about 9:1. The catalytic cracking process may be carried out in a fixed bed, moving bed, ebullated bed, slurry, transfer line (dispersed phase) or fluidized bed operation, the latter being preferred. More preferably, the catalytic cracking process is carried out in a hydrocarbon/catalyst suspension traversing a tubular reactor or "riser".

Spent catalyst and cracked hydrocarbon products from the riser which is at least partially within a reactor vessel then enters a separation zone within the reactor vessel. Cracked hydrocarbons vapors and catalyst particles pass into at least one cyclone which substantially separates catalyst from vapor. The deactivated catalyst from the cyclone(s) is conducted to the base of the reactor vessel which functions as a stripping zone.

In the stripping zone, spent catalyst is contacted with steam. Typical stripping steam rates are 2–5 lbs. per 1,000 lbs. (0.91–2.3 kg. per 454 kg)of circulating catalyst. The steam strips a sizeable fraction (majority) of adsorbed hydrocarbons and any emulsion phase hydrocarbons. These hydrocarbons are then combined with cracked hydrocarbon vapor products from cyclones for downstream separation. Inefficient stripping results in undesirable consequences such as loss of product, reduced efficiency of regenerator operations, catalyst deactivation and incomplete regeneration of spent catalyst.

Stripping efficiency is a function of the amount of steam used for stripping. However, increasing the amount of steam must be balanced against the economics of added steam consumption. Typically, stripping efficiency is determined by hydrogen content of coke burned in the regenerator which is in turn determined from an analysis of the amounts of oxygen, carbon monoxide and carbon dioxide in the regenerator flue gas. However, this method cannot discriminate between coke and strippable hydrocarbon (hydrocarbon carryover) remaining on the spent catalyst as it enters the regenerator. FIG. 2 is a plot of heat of combustion of coke as a function of hydrogen to carbon ratio of coke burned in the regenerator.

After the deactivated catalyst is stripped of strippable hydrocarbon, the catalyst is then conducted to a regenerator. Suitable regeneration temperatures include a temperature ranging from about 1100° to about 1500° F. (593° to about 816° C.), and a pressure ranging from about 0 to about 150 psig (101 to about 1136 kPa). The oxidizing agent used to contact the at least partially deactivated (i.e., coked or spent) catalyst will generally be an oxygen-containing gas such as air, oxygen and mixtures thereof. The at least partially deactivated catalyst is contacted with the oxidizing agent for a time sufficient to remove, by combustion, at least a portion of the carbonaceous deposit and thereby regenerate the catalyst in a conventional manner known in the art.

FIG. 1 shows the stripping zone and analysis zone of this invention. Spent catalyst from cyclone(s) (not shown) is collected as a bed 14 in stripping zone 12 of reactor vessel 11. Steam is admitted to stripping zone 12 through line 15.

Stripped hydrocarbon and steam from bed 14 are conducted upwardly through reactor 11 for further separation and processing. Stripped catalyst is conducted from stripping zone 12 to a catalyst regenerator (not shown) through line 16.

Stripped catalyst is removed from line 16 through tap 17. With lower lockhopper valve 22 in the closed position, upper lockhopper valve 21 is opened for a time sufficient to fill the zone 18 between lockhopper valves 21 and 22. Valve 21 is then closed and valve 22 is opened to drop a known volume of catalyst into catalyst collection vessel 23. Vessel 23 is heated by means such as jacket heaters on the shell to promote stripping of any hydrocarbon remaining on spent catalyst. Valve 22 is closed and valve 24 is opened which allows stripping gas to enter collection vessel 23. The stripping gas may be any inert gas such as nitrogen or air. Valves 25 and 28 are opened to allow stripped hydrocarbon vapors to flow through oxidizing vessel 27 which may have jacket heaters on the shell. Oxygen or air is admitted through valve 26. The oxygen or air is metered, controlled and continuously flowing to provide oxygen for the oxidizing vessel 27 and to flush out lines between stripping cycles. Hydrocarbons stripped from vessel 23 are oxidized to carbon dioxide and water in oxidizng vessel 27 which contains an oxidizing catalyst. Such oxidizing catalysts are well known in the art and include Pt, Pd, $CrO_3$, $V_2O_5$ and others on an inert support. Carbon dixoide and water vapor are conducted to analyzer 29 and subsequently vented to the atmosphere. Valve 25 is then closed, and valve 24 is opened followed by valves 22 and 21 to fluidize and blow the catalyst sample back into line 16. Valve 21 is then closed followed by valve 22.

Analyzer 29 may be any analyzer capable of analyzing for carbon dixoide and/or water under flowing gas conditions, e.g., a gas chromatograph or an infrared spectrometer. Infrared spectrometry is the preferred method of analysis. By knowing the amount of sample in vessel 23 and the amount of carbon dioxide and/or water formed, one can calculate the amount of strippable hydrocarbon present in the sample. Information from analyzer 29 can be transmitted to steam controller 19 in order that stripping conditions in stripping zone 14 can be optimized for removing the maximum amount of strippable hydrocarbon by adjusting steam addition rate and/or bed height of spent catalyst in stripping zone 14. This permits the system to operate in on-line mode for continuous operation.

The method of the present invention is further illustrated by the following example.

EXAMPLE 1

This example illustrates the method for utilizing analytical information on the amount of strippable hydrocarbon on deactivated FCC catalyst to maximize recovery of strippable hydrocarbon. The follwing table sets forth conditions for stripped catalyst.

TABLE

|  | Case I | Case II | Case III |
| --- | --- | --- | --- |
| Oil Feed, K lb/D | 85.5 | 85.5 | 85.5 |
| Riser Outlet Temp., °F. | 1020 | 1018 | 1020 |
| Riser Pressure, psig | 33.2 | 33.2 | 33.2 |
| Cat Oil Raio | 5.51 | 5.51 | 5.51 |
| Regen Bed Temp., °F. | 1322 | 1322 | 1322 |
| Coke on Regenerated | 0.08 | 0.08 | 0.08 |

TABLE-continued

|  | Case I | Case II | Case III |
| --- | --- | --- | --- |
| Catalyst (wt. %) |  |  |  |
| Coke on Spent Catalyst (wt. %) | 0.8 | 0.8 | 0.8 |
| Flue Gas Composition, Mol % |  |  |  |
| $O_2$ | 0.08 | 0.08 | 0.08 |
| $CO_2$ | 17.0 | 16.9 | 17.6 |
| CO | 1.61 | 1.61 | 0.6 |
| $CO_2$/CO Ratio | 10.5 | 10.5 | 29.8 |
| Stripper Temp., °F. | 1013 | 988 | 990 |
| Stripping Stream K lb/hr | 25.0 | 25.0 | 28.0 |
| Coke Make, wt. % on Feed | 3.77 | 3.94 | 3.77 |
| Spent Coke H/C, wt/wt | 0.062 | 0.065 | 0.062 |

In all three cases, the FCC unit feed is of constant rate and composition. The riser conditions are the same for all of the cases as is the quality of the regenerated catalyst as measured by coke on the regenerated catalyst.

In going from Case I to Case II, the stripper temperature has dropped while the stripping steam rate is uncahnged at 25.0 klb/hr (11,340 kg/hr). Conventional measures of stripper performance are unchanged. The measured coke on spent catalyst remains at 0.8 wt. %. The composition of the flue gas from the regenerator is also unchanged.

However, the coke make has increased by nearly 5% due to poorer stripping of the adsorbed hydrocarbons on the spent catalyst. Coke is the least economically desirable product from an FCC unit. The hydrogen/carbon ratio on the spent catalyst has increased indicating that the composition of the coke has changed due to the increased strippable hydrocarbon concentration. Conventional monitoring of unit performance would be extremely slow to indicate the increase in coke make; however, the use of this invention would quickly indicate the change in stripper performance thereby allowing real time optimization.

As stripper temperature is not readily controlled, the most likely optimization step is to increase stripping steam rate as shown in case III. By increasing the stripping steam rate by 3.0 klb/hr (1360 kg/hr), the coke make and composition return to the values of the base case (case I), thereby minimizing the product downgrade to coke.

What is claimed is:

1. A catalytic cracking process in which hydrocarbon feed is contacted with zeolite catalyst under catalytic cracking conditions in a reactor zone, catalyst which is at least partially deactivated and cracked hydrocarbon products are separated in at least one separation zone, separated catalyst is at least partially stripped of strippable hydrocarbon in a stripping zone under stripping conditions, stripped catalyst is contacted with oxidizing gas in a regenerator under regenerating conditions to remove carbonaceous deposits from the at least partially deactivated and stripped catalyst and regenerated catalyst is contacted with further hydrocarbon feed wherein the improvement comprises:

real time optimizing stripping zone performance by the steps of:
 (a) removing a sample of at least partially deactivated and stripped catalyst between the stripping zone and the regenerator,
 (b) conducting the deactivated and stripped catalyst sample to a heated catalyst collection vessel wherein the collection vessel is heated to a temperature sufficient to promote stripping of any hydrocarbon remaining on the deactivated and stripped catalyst;
 (c) adding a stripper gas to the collection vessel thereby removing remaining strippable hydrocarbon from the deactivated and stripped catalyst, (d) conducting the remaining stripped hydrocarbon to a heated gas collection vessel containing an oxidation catalyst,
(e) oxidizing the remaining stripped hydrocarbon to carbon dioxide and water,
(f) measuring the amount of at least one of carbon dioxide and water,
(g) conducting the stripped deactivated catalyst sample from step (c) back to the deactivated catalyst sent to the regenerator,
(h) calculating the amount of strippable hydrocarbon present in the sample,
(i) transmitting the calculated information on the value of remaining strippable hydrocarbon present in the sample to a steam controller in the stripping zone, and
(j) adjusting stripping zone conditions on line to maximize the removal of strippable hydrocarbon in the stripping zone by adjusting at least one of steam addition rate and bed height of spent catalyst in the stripping zone thereby resulting in continuous real time optimization of stripping zone performance.

2. The process of claim 1 wherein the gas collection vessel containing an oxidation catalyst is heated.

3. The process of claim 1 wherein the measuring of carbon dioxide and/or water is done by an infrared spectrometer.

4. The process of claim 1 wherein the measuring of carbon dioxide and/or water is done by a gas chromatograph.

5. The process of claim 1 wherein the calculation of amount of strippable hydrocarbon occurs in on-line mode for continuous operation.

* * * * *